(12) United States Patent
Makhija

(10) Patent No.: US 9,055,113 B2
(45) Date of Patent: Jun. 9, 2015

(54) METHOD AND SYSTEM FOR MONITORING FLOWS IN NETWORK TRAFFIC

(75) Inventor: Dinesh Makhija, Westford, MA (US)

(73) Assignee: Arbor Networks, Inc., Burlington, MA (US)

( * ) Notice: Subject to any disclaimer, the term of this patent is extended or adjusted under 35 U.S.C. 154(b) by 865 days.

(21) Appl. No.: 12/860,127

(22) Filed: Aug. 20, 2010

(65) Prior Publication Data

US 2012/0047248 A1    Feb. 23, 2012

(51) Int. Cl.
*H04L 29/08* (2006.01)
*H04L 12/24* (2006.01)

(52) U.S. Cl.
CPC ............ *H04L 67/22* (2013.01); *H04L 41/0893* (2013.01); *H04L 67/306* (2013.01); *H04L 67/02* (2013.01)

(58) Field of Classification Search
CPC . H04L 12/2602; H04L 67/22; H04L 63/1408; H04L 63/1425; H04L 63/20; G06F 21/552; H04N 21/2407; H04N 21/442; H04N 21/44209; H04W 24/00
USPC ......... 709/223–225, 231; 705/14.25; 715/745
See application file for complete search history.

(56) References Cited

U.S. PATENT DOCUMENTS

| | | | | |
|---|---|---|---|---|
| 5,715,468 A * | 2/1998 | Budzinski | ............ | 704/9 |
| 5,987,611 A * | 11/1999 | Freund | ............... | 726/4 |
| 6,269,395 B1 * | 7/2001 | Blatherwick et al. | ......... | 709/219 |
| 6,779,031 B1 * | 8/2004 | Picher-Dempsey | ......... | 709/224 |
| 6,983,379 B1 * | 1/2006 | Spalink et al. | ................ | 705/50 |
| 7,089,582 B1 * | 8/2006 | Dutta | ................. | 726/3 |
| 7,089,587 B2 * | 8/2006 | Allen et al. | ...................... | 726/14 |
| 7,113,497 B2 * | 9/2006 | Cromer et al. | ................ | 370/338 |
| 7,360,251 B2 * | 4/2008 | Spalink et al. | .................. | 726/26 |
| 7,552,466 B2 * | 6/2009 | Rosenberg et al. | ............... | 726/4 |
| 7,567,568 B2 * | 7/2009 | Hanner | .......................... | 370/392 |
| 7,680,892 B2 * | 3/2010 | Knox et al. | ................... | 709/206 |
| 7,685,191 B1 * | 3/2010 | Zwicky et al. | ................ | 707/706 |
| 7,707,500 B2 * | 4/2010 | Martinez | ........................ | 715/717 |
| 7,971,260 B2 * | 6/2011 | Spalink et al. | .................. | 726/26 |
| 7,986,629 B1 * | 7/2011 | Ferguson et al. | ............. | 370/235 |
| 8,095,602 B1 * | 1/2012 | Orbach | .......................... | 709/206 |
| 8,312,002 B2 * | 11/2012 | Zwicky et al. | ................ | 707/706 |
| 2002/0112048 A1 * | 8/2002 | Gruyer et al. | ................. | 709/224 |
| 2002/0129088 A1 * | 9/2002 | Zhou et al. | .................... | 709/200 |
| 2002/0174041 A1 * | 11/2002 | Grey et al. | ....................... | 705/32 |
| 2003/0014659 A1 * | 1/2003 | Zhu | ............................... | 713/200 |

(Continued)

OTHER PUBLICATIONS

Hjelmvik, E., et al., "Breaking and Improving Protocol Obfuscation", Jul. 27, 2010, Department of Computer Science and Engineering, Chalmers University of Technology, Technical Report No. 2010-05.

*Primary Examiner* — Backhean Tiv
(74) *Attorney, Agent, or Firm* — Locke Lord LLP; Scott D. Wofsy; Christopher J. Capelli

(57) ABSTRACT

A method and system for correlating web content with content providers to determine the origin of the content such that it is not necessary to look inside the information exchange. The method and system maintains sequences of reference points, which are ordered lists of content providers accessed by subscribers over time, and correlates the internet content applications, such as video, found in network traffic to the sequence of reference points accessed by subscribers to determine the origins of the content even when the content being delivered by third-party content delivery networks.

16 Claims, 8 Drawing Sheets

(56) References Cited

U.S. PATENT DOCUMENTS

| | | | |
|---|---|---|---|
| 2004/0049596 A1* | 3/2004 | Schuehler et al. | 709/238 |
| 2004/0100945 A1* | 5/2004 | Morita et al. | 370/360 |
| 2004/0172466 A1* | 9/2004 | Douglas et al. | 709/224 |
| 2006/0031366 A1* | 2/2006 | Dolph | 709/207 |
| 2006/0140182 A1* | 6/2006 | Sullivan et al. | 370/389 |
| 2006/0184671 A1* | 8/2006 | Boys | 709/224 |
| 2008/0103971 A1* | 5/2008 | Lukose et al. | 705/40 |
| 2008/0152260 A1* | 6/2008 | Cheng et al. | 382/284 |
| 2008/0262797 A1* | 10/2008 | Carusi et al. | 702/186 |
| 2008/0306830 A1* | 12/2008 | Lasa et al. | 705/26 |
| 2009/0043739 A1* | 2/2009 | Choi | 707/3 |
| 2009/0092183 A1* | 4/2009 | O'Hern | 375/240.01 |
| 2009/0125827 A1* | 5/2009 | Zeigler et al. | 715/765 |
| 2009/0280783 A1* | 11/2009 | Klassen et al. | 455/414.1 |
| 2009/0327913 A1* | 12/2009 | Adar et al. | 715/745 |
| 2010/0082808 A1* | 4/2010 | Vaynblat et al. | 709/224 |
| 2010/0131441 A1* | 5/2010 | Gruenhagen et al. | 706/45 |
| 2010/0211608 A1* | 8/2010 | Dolganow et al. | 707/803 |
| 2010/0235826 A1* | 9/2010 | Garcia et al. | 717/173 |
| 2010/0250710 A1* | 9/2010 | Cadwell et al. | 709/219 |
| 2010/0257024 A1* | 10/2010 | Holmes et al. | 705/10 |
| 2011/0119209 A1* | 5/2011 | Kirshenbaum et al. | 706/12 |
| 2011/0119267 A1* | 5/2011 | Forman et al. | 707/737 |
| 2011/0176437 A1* | 7/2011 | Sekiguchi | 370/252 |
| 2011/0185436 A1* | 7/2011 | Koulinitch et al. | 726/28 |
| 2012/0008494 A1* | 1/2012 | Laoutaris et al. | 370/230 |
| 2012/0030408 A1* | 2/2012 | Flynn et al. | 711/102 |
| 2012/0066352 A1* | 3/2012 | Cadwell et al. | 709/219 |

* cited by examiner

Fig. 3

```
Configuration File
Format : Application, Program, Content Provider, Aggregator, CDN, Media

-HULU_VIDEO : any, any, "hulu.com", any, VIDEO
-NBC_VIDEO : any, "nbc.com", "hulu.com", any, VIDEO
-DAILY_SHOW : "thedailyshow", "nbc.com", "hulu.com", any, VIDEO
-MOVENETWORKS: any, Any, "movenetworks.com", any, VIDEO
-ESPN_VIDEO : any, "espn360", "movenetworks.com", any, VIDEO
-WINTER_OLYMPICS : "winterOlympics", "espn360.com", "movenetworks.com", "any, VIDEO
```

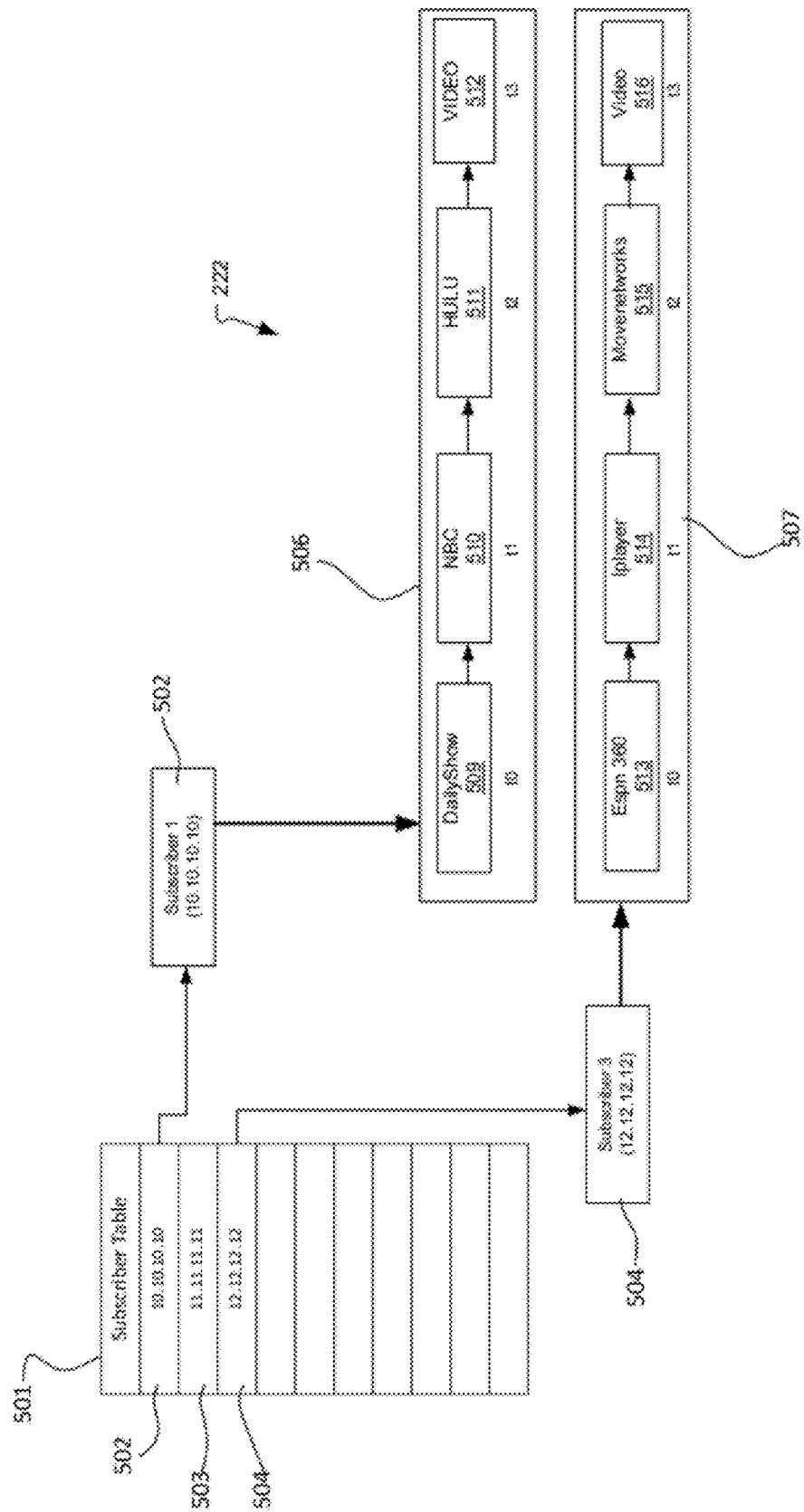

METHOD AND SYSTEM FOR MONITORING FLOWS IN NETWORK TRAFFIC

BACKGROUND OF THE INVENTION

The Internet is a global public network system of interconnected computer networks. It consists of millions of private, public, business and government networks that are all interconnected through a series of electronic, wireless and/or optical connections that are typically maintained by governmental entities and internet service providers (ISPs).

Content provider is a term used to describe an entity that distributes typically informational, educational, and/or entertainment content over the networks. Typically the content is accessed via websites using hypertext transport protocols (HTTP) and is mixture of internet content applications such as text files, image files, audio/video files, or application programs. Users navigate the Internet with a browser, which is a program designed to transfer information on the Internet. When a user types in a website's universal resource locator (URL) into the browser the information is transmitted to the ISP. The ISP routes that information to the corresponding content provider's website, which then transmits data back to the user including the content.

Every year the amount of content being added to the Internet continues to grow and the amount of people with high-speed internet access also grows. Likewise, many popular content provider websites like google.com, yahoo.com, hulu.com or youtube.com are visited by new users every day. Because of the ever-increasing internet traffic, there was a need to reliably, economically, and efficiently provide ever-richer content to an ever-growing number of users. To accomplish that goal, many content providers use content delivery networks (CDNs). CDNs are networks of server computers that store copies of the content and are typically distributed throughout the country and the world. In short, CDNs are storage centers that allow content providers to store multiple copies of their content in networks around the country, instead of in one single location. Some companies own and operate their own CDNs, while others will use a service from a third party.

There are benefits to storing and distributing content using a CDN. All the network traffic is not being routed to a single a location (URL) creating a bottleneck at the content provider. Rather, users are directed to one of the many CDNs to reduce strain on the network. Generally, the use of CDN also increases performance and decreases download times because the users accessing the content can be directed to CDNs that are local to the users, often avoiding the need to transmit the data over long distances. This reduces latency and decreases traffic on major internet backbones. Additionally, there is a built in redundancy. If a CDN network is unavailable because of a power outage or even lost completely due to a disaster, the other CDNs are still able to provide content to users.

By way of example, a user will navigate to a content provider's website and select web content to access. The content could be any internet content application such as a video, audio, or image file or application program. The website will then direct the user to URL or internet protocol (IP) address hosted by a CDN, where the content is stored, and the user will receive the content from the CDN. Generally, the entire process of delivering the content to user is designed to be a seamless and transparent operation providing an experience that leaves the user unaware that the content was accessed from a CDN, and not the content provider's website.

At the enterprise, ISP, and public network scale, network management systems are used to monitor networks. These systems can exist as stand-alone, dedicated systems or be embedded in network communications devices such as routers and switches. One specific example is NetFlow technology offered by Cisco Systems. Other tools include special-purpose systems, such as firewalls and other network security devices, which are typically used to manage the communications at boundaries between the networks.

One source of information for monitoring networks is flow information. This is defined as "a unidirectional sequence of packets with some common properties that pass through a network device." Internet Engineering Task Force, RFC 3954. Flow records are often generated by the network devices. These are often digested information concerning individual network flows or groups of network flows sharing some common characteristic(s). The flow records often include, for example, internet protocol (IP) addresses, packet and byte counts, timestamps, Type of Service (ToS), application ports, input and output interfaces, to list a few examples. This information is available from Netflow technology, for example. Generally, computer network devices that generate flow records include, for example, routers, switches, firewalls, and hubs. In other examples, packet scanners/analyzers (e.g. Arbor Networks PEAKFLOW® threat management system (TMS)) are used. Flows may be collected and exported for analysis. Flow analysis is a central component of large-scale network management and service systems, usually deployed by ISPs.

Network management systems allow the network administrators to apply policies. Policies are typically used to govern or dictate how entities are allowed to communicate over the network, generally called security policies. These policies can be applied to entities individually, by setting operating parameters of devices separately. Policy-based management systems have simplified configuration of devices by allowing administrators to define a policy and apply this policy across groups of network entities, generally.

A policy is a collection of rules. A rule, for example, can be defined to govern what traffic a particular firewall ignores or prevents a given address or device from accessing a particular service or network resource. The rules can be applied by routers that decide whether to forward packets from or to a particular address.

Network policies are often defined and applied based on flow information. Moreover, many products are available that attempt to correlate flow information with other data sources to provide value-added analysis. These types of analysis tools are now a central component of administering large communication networks. Such analysis facilitates the creation of higher level policies that facilitate the management of the network.

SUMMARY OF THE INVENTION

The use of content delivery networks create problems for ISPs because it is difficult to accurately determine what content is being accessed and the originating content provider. The analysis of network packets and flow records will show two unrelated flows: between the user and the content provider and then between the user and the CDN. Nevertheless understanding the relationship between the content providers and the CDNs could be used to facilitate provisioning by the ISPs. Moreover, the ISP's could then deploy network policies that regulated content distribution over their networks even when CDN's are used by the providers.

For these reasons, it would be desirable for ISPs or other network operators to have a method and system that could correlate internet content applications, which was accessed by end users (also referred to as subscribers), with the content providers even if the request is made out-of-band to a CDN or other content provider.

An embodiment of the present invention targets specific users, specific content providers, and/or specific web content accessed by users. This approach allows the network owner, such as an ISP, to use fewer resources and focus on monitoring only relevant information. Thus, the ISP has a more efficient and more economical method and system and is not wasting resources collecting unwanted information.

A current embodiment of the present invention collects and stores sequences of reference points accessed by subscribers. The sequence of reference points is an ordered list of URLs or IP addresses corresponding usually to content providers, typically websites, accessed over time. The system typically records specific content from specific content providers and targets specific users, in one implementation. Thus, if a user is not a targeted user or a content provider is not a targeted content provider, then that information can be ignored or discarded.

Network traffic is monitored for characteristics of the internet content applications to be monitored. The characteristics of applications are found, for example, by examining TCP/UDP ports or searching for patterns found in the network traffic. In one example, this is accomplished by monitor flows and then classifying the flows to different internet content applications. After such classification, statics and other data are maintained on the flows. Examples of patterns that identify the type of internet content application include stateful messages, rate, payload lengths, and message sequences. By monitoring the network and searching for characteristics of internet content applications, the embodiments of the system are able to determine when an application is being transmitted without having to examine every packet or knowing what the actual content is.

When a characteristic of an internet content application is found in the network traffic, the system searches the sequence of reference points accessed by the subscribers to correlate the application with the sequence of reference points for the subscribers and determine the origins of the internet content application. The correlation is performed by matching the application, which was located by searching for characteristics, with the sequence of reference points maintained for the subscribers. This information is then stored to a database for future analysis and report generation.

In embodiments, if a predetermined amount of time has elapsed between updates to the sequence of reference points, then points will be deleted, and new reference points will be created.

In short, the system maintains a record of content providers accessed by subscribers that are stored as an ordered list over time. Then the system monitors network traffic for characteristics of internet content applications, e.g., video content, that indicate the targeted application is being transmitted. The system performs the necessary verification to ensure that characteristics found are correct, i.e. not a false positive, and the sequence of reference points are current. Then the system will correlate the application or content accessed by subscribers with the recently accessed web content to determine the origin of the content. This information is then stored to a database that can be later used to inform decisions concerning network provisioning or billing. It can also be used to define access policies based on the source (content provider) of the web application.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 is an illustration of an exemplary configuration file, which includes fields, and has been initialized with data.

FIG. 4 is an illustration of how subscribers are stored in a subscribers table and how a sequence of reference points is maintained for each subscriber over time in a traversal table database;

DETAILED DESCRIPTION OF THE PREFERRED EMBODIMENTS

Figure 1:
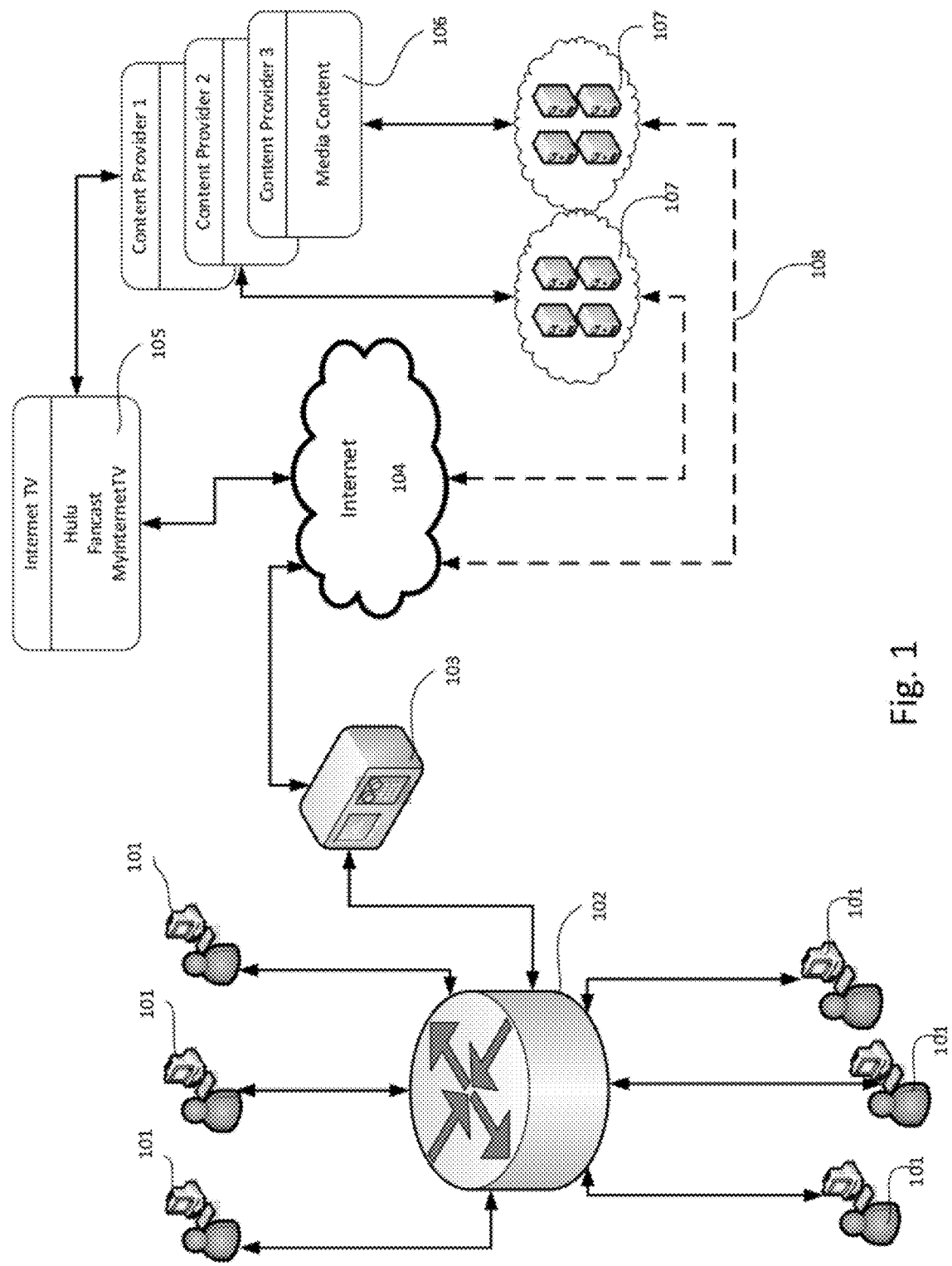
FIG. 1 is a block diagram providing an overview of the interrelationship between users, ISPs, network analysis tools, the Internet, content providers, and content delivery networks (CDNs)

FIG. 1 is a block diagram providing an overview of the interrelationship between the subscribers 101, internet service provider 102, a network monitoring system 103, the Internet 104, content providers 105, web content 106, content delivery networks 107, and out-of-band transmissions 108.

In more detail, subscribers 101 are connected to an ISP 102 through a communication path. Typically, packet data connections are made through a phone connection via dial-up modem, a digital subscriber line (DSL) connection, cable connection, fiber optics connection, leased line connection and/or wireless communication. The packet data are transmitted from the ISP 102, through the Internet 104, to the content provider 105 by a series of network devices such as gateways, repeaters, routers, hubs, and switches maintained by the ISP and other entities.

The ISP 102 monitors network traffic with the network monitor 103. The network monitor 103 intercepts and logs network traffic passing through a portion of the ISP network and/or between the ISP and the internet and/or receives flow information exported from network device. The network monitor 103 typically maintains digested flow information to analyze network communications, problems, detect network intrusions, or monitor usage. Networks also will have other tools such as firewalls or network protection devices (not shown) to block unauthorized traffic. In one example, the network monitor is an in-line device located on a network link and processes network packets. In other examples, the network monitor 103 receives only flow data from a network device, such as a router or switch.

In an example, the subscribers 101 navigate the Internet 104 and establish a connection to various content providers 105 to access the internet content applications 106. The internet content applications 106 typically include text and links and also image files, audio/video files, or other application programs. The content 106 is transferred from the content provider 105, through the Internet 104, through the network monitor 103, through the ISP 102, and finally to the subscribers 101.

Many content providers 105, particularly content providers requiring a large amount of storage or that support high bandwidth internet content applications such as video, audio or gaming will use a CDN 107 to store and host their content. Thus, when a user visits a content provider 105 at the provider's URL, and then accesses some web application, such a video or other media content 106, they will be redirected a CDN 107 where the content is stored. The users' redirection to a CDN 107 is typically a seamless and transparent transition to a URL or internet protocol address hosted by the CDN so that the user is unaware of the redirection. The CDN then delivers the data of the web application to the users 101, and then are typically returned to the content provider web site after completion of the data delivery associated with the internet content application.

Figure 2:
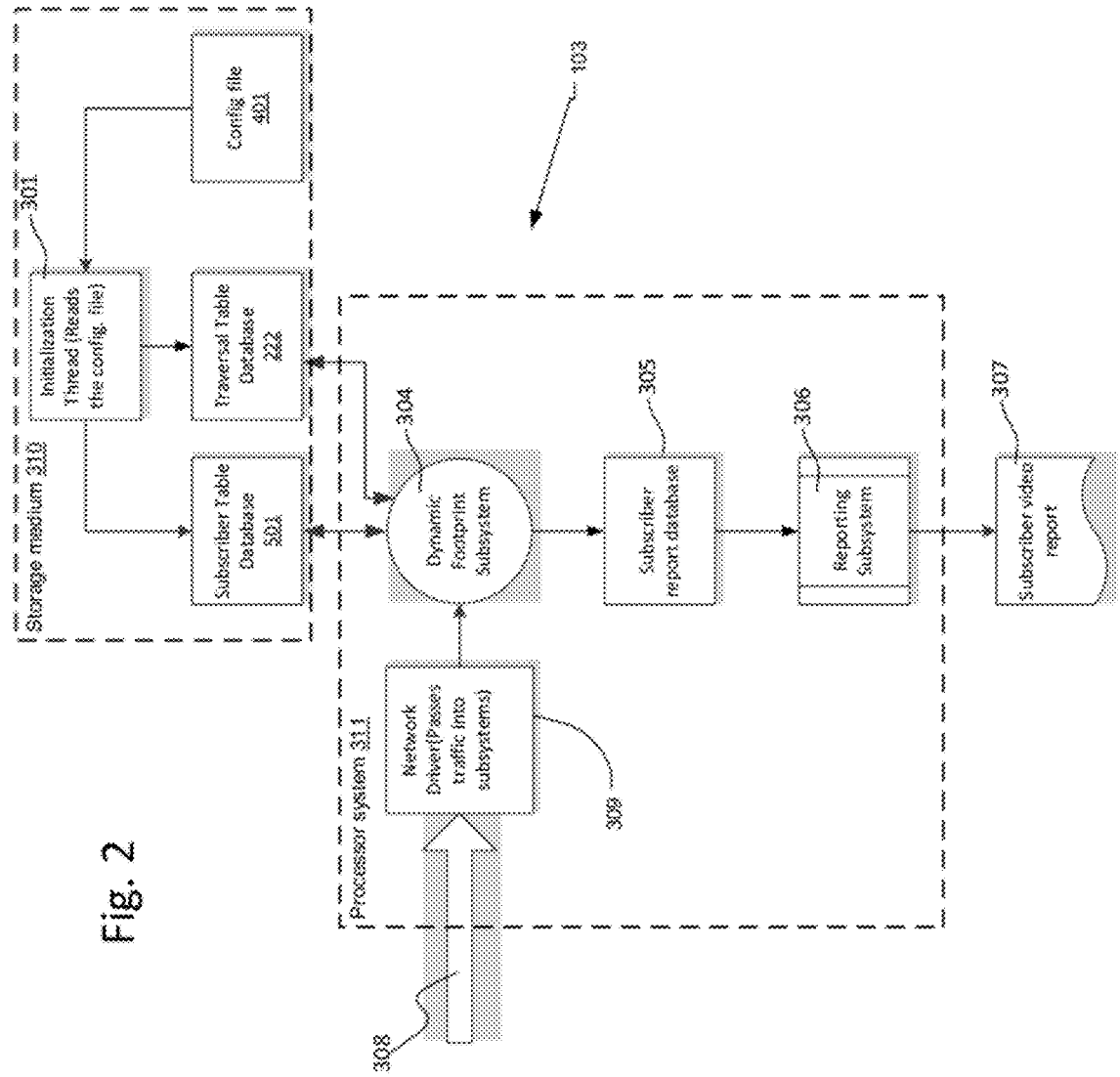
FIG. 2 is a block diagram providing an overview of the interrelationship of the subsystems in the network monitoring system, according to an embodiment of the invention.

FIG. 2 is a block diagram providing an overview of the interrelationship of the subsystems in the network monitor 103, according to an embodiment of the invention.

In general, the network monitor 103 comprises a processor system 311 that includes one or more computer processors and a data storage medium 310.

An initialization thread 301 executing on the processor system 311 reads a configuration file 401 and creates the table of subscribers 501. This database, stored in the storage medium 310 of the network monitoring system 103, stores a list of subscribers to be monitored, and stores sequences of reference points for those subscribers in a traversal table database 222 that is also stored in the memory 310 of the network monitoring system 103. During the initialization, the initialization thread 301 initializes the traversal table database and preferably populates the subscriber table database 501 with the list of subscribers to be monitored. Each reference point is time-stamped to permit chronological organization of the sequence of reference points.

Alternatively, in another embodiment the list of subscribers and reference points, i.e. content providers, are learned through content filtering of the network traffic. Typically, the content filters locate subscribers and content providers based on their usage of network resources. However, in alternative embodiments other filtering criteria, such as numbers of visits to a content provider, recent surge in popularity, or similar factors are used by a content filter to learn subscribers and content providers.

The network driver 309 provides an interface between the network traffic 308 and the dynamic footprint subsystem 304. The network driver passes network traffic or flow records describing network traffic.

The dynamic footprint system 304 is a process that executes on the processor system 311 and monitors the traffic for traffic from subscribers listed in the subscriber table 501. The dynamic footprint system 304 then extracts reference point information and updates the sequence of reference points for that subscriber in the traversal table 222. The sequence of reference points is an ordered list of content providers accessed by individual subscribers over time.

The dynamic footprint system 304 also monitors the traffic for characteristics of the internet content applications to be monitored in the network traffic. When found, the dynamic footprint system 304 searches the sequence of reference points for the subscribers accessing the monitored applications, and correlates the monitored applications with the reference points for the subscribers to determine the origin of the web applications.

The correlated information generated by dynamic footprint subsystem 304 is maintained in a subscriber report database 305. Additionally, the data are sent to a reporting subsystem 306 and reports 307 are generated based on the collected information.

In one example, the reports show the relationship between content providers and CDN or other content delivery modalities used by the content providers to deliver the content.

In other examples, a business relationship exists between the ISP that owns the network 102 and monitoring system 103 and a content provider 105 such as Hulu or NetFlix. If the ISP has contracted to provide preferred service to the content provider then the report is used to configure the ISP's network devices to provide preferred transport to the CDNs 107 utilized by the content provider 105. Further, the report preferably also provides usage information to enable the ISP to bill the content provider based on the actual usage of the network for transporting the provider's content even though the content was actually supplied via a third party CDN 107.

FIG. 3 is an illustration of an exemplary configuration file 401 that has predefined data according to the principles of the present invention.

In one embodiment of the present invention, the reference points, indicating known content providers, are learned through content filtering. In an alternative embodiment, the reference points are predefined with a configuration file 401. In still another embodiment, the reference points is obtained through a combination of predefined data and content filtering. In an exemplary embodiment the configuration file includes predefined entries for reference points; each entry includes an identifier such as: HULU_VIDEO, NBC_VIDEO, DAILY_SHOW, MOVENETWORKS, ESPN_VIDEO, and WINTER_OLYMPICS. Each entry in the configuration file 401 further stores the internet content application such as video. The entry also identifies any unique program that is used to access the content. For example, some internet game providers wrap the generic game code in a program that allows the game to run over an internet connection. The URL of the content provider is also listed, such as hulu.com, along with the URL or IP address of any aggregator or CDN.

FIG. 4 is an illustration of the relationship between the subscriber table 501 and sequence of reference points 506, 507 maintained for a subscriber over time in accordance with the principles of the present invention.

The table of subscribers 501 contains a list of the subscribers 502-504 to be monitored. Only the end users in the list of subscribers are monitored by the dynamic footprint subsystem 304. The subscribers 502-504 are maintained and referenced by an internet protocol address. In an example, a sequence of reference points 506, 507 is maintained for each of the subscribers 502, 504 respectively in the traversal table database 222. The sequence of reference points 506, 507 are ordered lists of content providers 509-512, 513-516 accessed by the subscriber over time.

Figure 5:
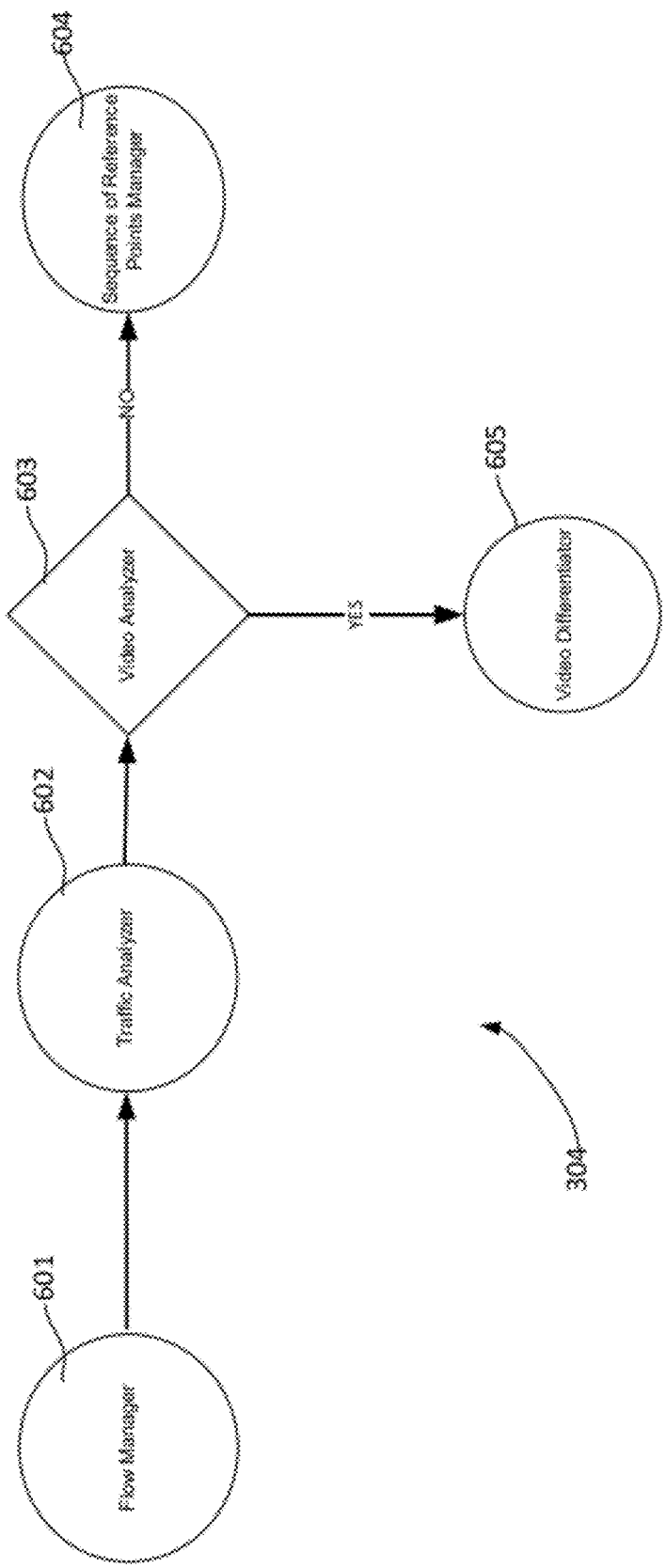
FIG. 5 is a block diagram illustrating a dynamic footprints analyzer.

FIG. 5 is a block diagram illustrating the subsystems that comprise the dynamic footprint subsystem 304 in accordance with the principles of the present invention.

The dynamic footprint subsystem 304 executes on the processor system 311 of the networking monitor 103 and has its own subsystems that are subroutines within the dynamic footprint subsystem 304. The first subsystem is the flow manager subsystem 601, which determines whether a sequence of reference points currently exists for a targeted subscriber. The flow manager subsystem 601 creates sequence of reference points if none exists, or will edit the current sequence of reference points if a sequence of reference points already exists. The flow manager 601 also associates the sequence of reference points with each subscriber.

The data are then passed to the traffic analyzer subsystem 602. The traffic analyzer subsystem 602 searches network traffic for characteristics of the applications to be monitored and verifies that the content was accessed by a targeted user. The information is then passed to the video analyzer subsystem 603, which verifies the internet content application to ensure that the correct content has been found by the traffic analyzer 602.

Once a characteristic of a internet content application to be monitored is found, the information is passed to the video analyzer subsystem 603. The video analyzer subsystem 603 verifies that the network traffic is the content or application being searched for. The verification operation is performed because false positives can occur where a characteristic of an application is mistakenly found in the network traffic. If the correct application is found, then video content is correlated to the content provider in the video differentiator subsystem 605. Conversely, if the network traffic is not the application being searched for, but the traffic is associated with a content provider being monitored, then the sequence of reference points will be updated with an additional entry in the sequence of reference points manager subsystem 604 associated with that content provider.

Figure 6:
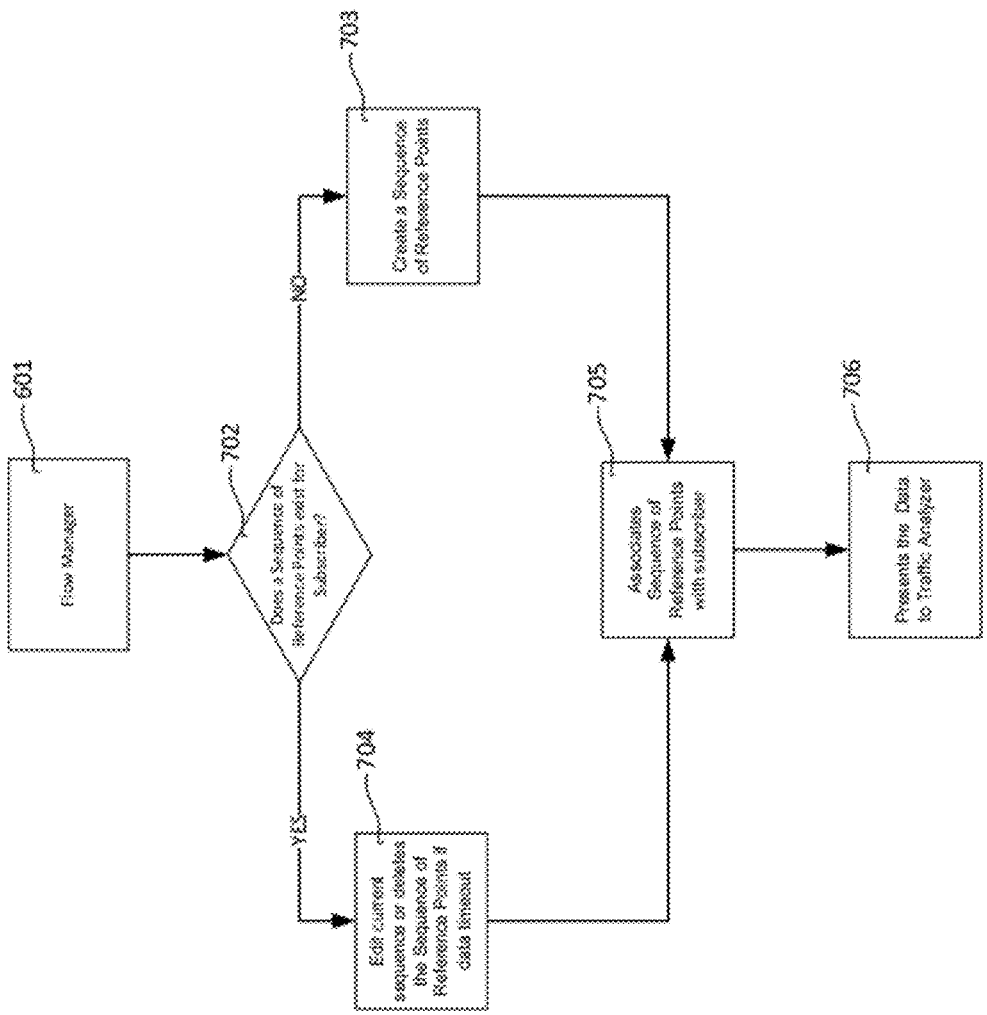
FIG. 6 is a flow diagram illustrating the operation of the flow manager.

FIG. 6 is a flow diagram illustrating the operation of the flow manager subsystem 601 according to the principles of the present invention.

The first step in the flow manager subsystem 601 is to determine whether a sequence of reference points exists for a subscriber 702. If a sequence of points does not exist, then a new sequence of reference points is created for the subscriber in step 703. If a sequence of reference points already exists for a subscriber, then the sequence of reference points will be updated 704. However, if too great a length of time has elapsed between updates to reference points, then the reference points are aged or deleted and a new reference points added in step 704. The next step is to associate the sequence of reference points with the subscriber in step 705. After the sequence of reference points has been associated with the subscriber, the information is passed to the traffic analyzer subsystem 602.

Figure 7:
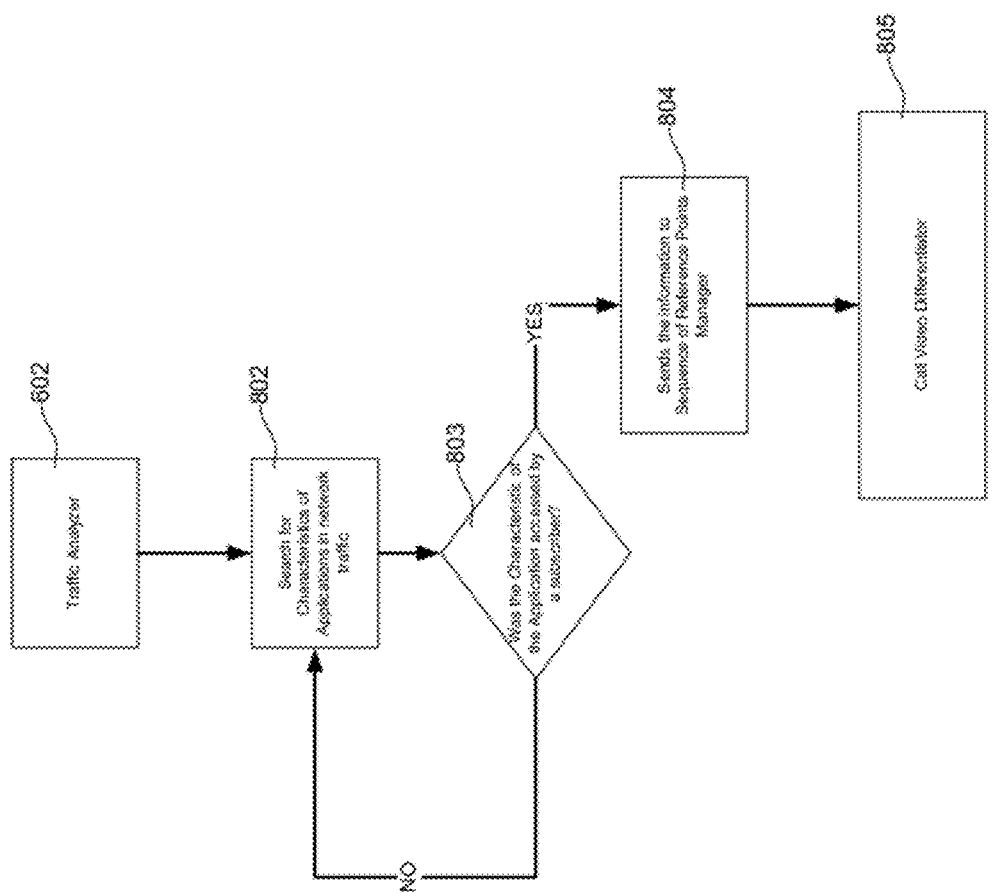
FIG. 7 is a flow diagram illustrating the operation of the traffic analyzer.

FIG. 7 is a flow diagram illustrating the operation of the traffic analyzer subsystem 602 according to the principles of the present invention.

The traffic analyzer subsystem 602 searches for characteristics of internet content applications in the new network traffic in step 802. In an exemplary embodiment, the system monitors the network traffic searching for video content, such as Real Time Messaging Protocol, Encrypted Real Time Messaging Protocol, or embedded Flash. Other characteristics of other applications content are searched for as well such as: Steam (which is a digital distribution, digital rights management, multiplayer and communications platform developed by Valve Corporation for internet game distribution), web objects, download-able objects (media files, software, documents), and/or real time media streams.

In an exemplary embodiment, the traffic analyzer subsystem 602 searches for characteristics of internet content applications by monitoring TCP/UDP ports, identifying sequences of bytes within a packet payload, inspection of stateful messages, or searching for patterns found in the network traffic. It also monitors for activity involving content providers such as subscribers accessing web sites or IP addressed of content providers.

Once a characteristic is found, the traffic analyzer subsystem 602 determines if the content was accessed by a subscriber in step 803. If the content was not accessed by a subscriber, then the information is discarded and the traffic analyzer subsystem 602 continues to monitor network traffic 308 for characteristics of internet content applications or content providers. However, if a characteristic of the application is found or the and it was accessed by a targeted subscriber then the information is sent to the reference point manager subsystem 604 in step 804 to update the sequence of reference points and to the video differentiator subsystem 605 in step 805 to correlate the video with content provider.

Figure 8B:
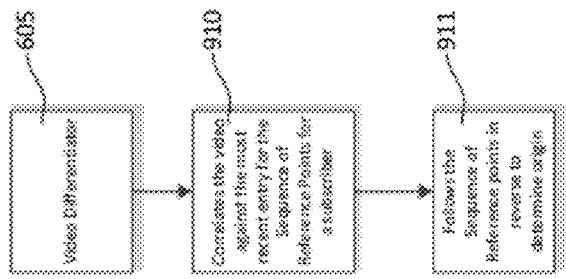
FIG. 8B is a flow diagram showing the operation of the video differentiator.
Figure 8A:
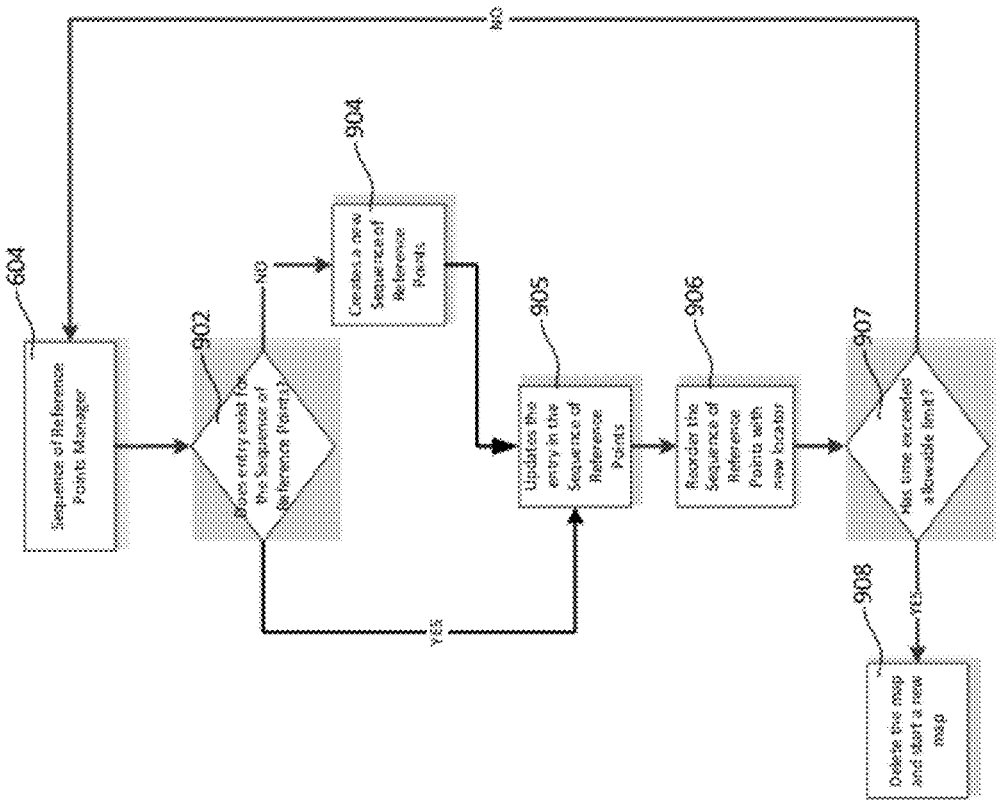
FIG. 8A is a flow diagram illustrating the operation of the reference point manager.

FIG. 8A is a flow diagram illustrating the operation of the sequence of reference points manager subsystem 604 according to the principles of the present invention.

The first step for the sequence of reference points manager subsystem is to determine whether an entry exists for the sequence of reference points for the content provider that the subscriber is accessing in step 902. If an entry exists, then the current entry is updated in step 905 with a new timestamp. If a sequence of reference point does not exist, then a new sequence of reference points will be created in step 904.

Next, the sequence of reference points is reordered so that the most recent reference point is maintained at the head of the list in step 906.

The next step is determining whether the allowable time limit has been exceeded 907. If too great a length of time elapses between the updates of the sequence of reference points, then the sequence will be deleted and a new sequence of reference points will be created 908.

FIG. 8B is a flow diagram showing the operation of the video differentiator subsystem 605 according to the principles of the present invention The first step in the video differentiator subsystem 605 is to correlate the internet content application, such as video content, with the most recent reference point for the subscriber in step 910. This action is performed by following the sequence of reference points in reverse to locate to the most recent reference point and correlating that reference point with the content found in the network traffic in step 911. The most recent reference point in the sequence of reference points is the most recent content provider accessed by a subscriber. In other examples, the heuristics are used to find a match between the specific CDN supplying the content and the content providers indicated by the recent reference points based on previously known relationships between the CDNs and content providers. Thus, the video differentiator subsystem 605 will correlate the content with a content provider to determine the origin of the monitored application.

The data that are generated by the correlation in the video differentiator is stored in subscriber report database 305 for future analysis. As described previously, these data are accessed by the reporting subsystem 306.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for correlating network traffic, the method comprising:
   determining one or more content providers accessed by a subscriber;
   maintaining a sequence of reference points for the subscriber, the sequence of reference points being ordered lists of the one or more content providers accessed by the subscriber;
   monitoring network traffic for characteristics of an internet content application to be monitored comprises examining one or more of TCP/UDP ports of the network traffic, patterns found in network traffic, stateful messages in the network traffic, or network traffic based on rate, payload lengths, and message sequence; and
   upon finding the characteristics of the monitored internet content application in the network traffic, searching the sequence of reference points for the one or more content providers accessed by the subscriber, determine whether an entry exists for the sequence of reference points for the content provider that the subscriber is accessing; and when an entry exists then updating the entry in the sequence of reference points with a new timestamp, and when the reference points do not exists, then a new sequence of reference points will be created, and reordering the sequence of reference points so that the most recent reference point is maintained at a head of a list;
   correlating the internet content application with the one or more content providers accessed by the subscriber to determine a content provider for the internet content application; and
   storing to a database the monitored internet content application and content providers originating the monitored internet content applications based on the reference points.

2. The method according to claim 1, further comprising deleting reference points for the subscriber after a predetermined amount of time has elapsed.

3. The method according to claim 1, wherein the step of monitoring the network traffic for the monitored internet content application comprises examining TCP/UDP ports of the network traffic.

4. The method according to claim 1, wherein the step of monitoring the network traffic for the monitored internet content application comprises examining patterns found in network traffic.

5. The method according to claim 1, wherein the step of monitoring the network traffic for the monitored internet content application comprises examining stateful messages in the network traffic.

6. The method according to claim 1, wherein the step of monitoring the network traffic for the monitored internet content application comprises examining the network traffic based on rate, payload lengths, and message sequences.

7. The method according to claim 1, wherein the step of maintaining a sequence of reference points for the subscriber comprises defining the subscriber to be monitored from a list of subscribers.

8. The method according to claim 1, wherein the step of maintaining a sequence of reference points for the subscriber comprises learning the subscriber to be monitored by monitoring the network traffic.

9. A system for correlating network traffic, the system comprising:
   a memory configured to store instructions;
   a processor disposed in communication with said memory, wherein said processor upon execution of the instructions is configured to:
   determine one or more content providers accessed by a subscriber;
   maintain a sequence of reference points for the subscriber, the sequence of reference points being ordered lists of the one or more content providers accessed by the subscriber;
   monitor network traffic for characteristics of an internet content application to be monitored comprising examining one or more of TCP/UDP ports of the network traffic, patterns found in network traffic, stateful messages in the network traffic, or network traffic based on rate, payload lengths, and message sequence; and
   upon finding the characteristics of the monitored internet content application in the network traffic, searching the sequence of reference points for the one or more content providers accessed by the subscriber, determine whether an entry exists for the sequence of reference points for the content provider that the subscriber is accessing; and when an entry exists then updating the entry in the sequence of reference points with a new timestamp, and when the reference points do not exists, then a new sequence of reference points will be created, and reordering the sequence of reference points so that the most recent reference point is maintained at a head of a list;
   correlate the internet content application with the one or more content providers accessed by the subscriber to determine a content provider for the internet content application; and
   store to a database the monitored internet content application and content providers originating the monitored internet content applications based on the reference points.

10. The system according to claim 9, further comprising deleting reference points for the subscriber after a predetermined amount of time has elapsed.

11. The system according to claim 9, wherein monitoring the network traffic for the monitored internet content application comprises examining TCP/UDP ports of the network traffic.

12. The system according to claim 9, wherein monitoring the network traffic for the monitored internet content application comprises examining patterns found in network traffic.

13. The system according to claim 9, wherein monitoring the network traffic for the monitored internet content application comprises examining stateful messages in the network traffic.

14. The system according to claim 9, wherein monitoring the network traffic for the monitored internet content application comprises examining the network traffic based on rate, payload lengths, and message sequences.

15. The system according to claim 9, wherein maintaining a sequence of reference points for the subscriber comprises defining the subscriber to be monitored from a list of subscribers.

16. The system according to claim 9, wherein maintaining a sequence of reference points for the subscriber comprises learning the subscriber to be monitored by monitoring the network traffic.

* * * * *